US009745150B2

(12) United States Patent
Coots

(10) Patent No.: US 9,745,150 B2
(45) Date of Patent: Aug. 29, 2017

(54) TIE PLATE SEPARATOR AND METHOD THEREOF

(71) Applicant: B&B Metals, Inc., Shepherdsville, KY (US)

(72) Inventor: William R. Coots, Lebanon Junction, KY (US)

(73) Assignee: B&B Metals, Inc., Shepherdsville, KY (US)

( * ) Notice: Subject to any disclaimer, the term of this patent is extended or adjusted under 35 U.S.C. 154(b) by 144 days.

(21) Appl. No.: 14/613,911

(22) Filed: Feb. 4, 2015

(65) Prior Publication Data

US 2015/0144458 A1 May 28, 2015

Related U.S. Application Data

(63) Continuation of application No. 13/428,809, filed on Mar. 23, 2012, now Pat. No. 9,016,208.

(51) Int. Cl.

| | |
|---|---|
| ***E01B 29/32*** | (2006.01) |
| ***B65G 54/02*** | (2006.01) |
| ***B65G 37/00*** | (2006.01) |
| ***B65G 47/92*** | (2006.01) |

(52) U.S. Cl.

CPC ............. *B65G 54/02* (2013.01); *B65G 37/00* (2013.01); *B65G 47/92* (2013.01); *E01B 29/32* (2013.01)

(58) Field of Classification Search

CPC .......... E01B 29/02; E01B 29/05; E01B 29/16; E01B 29/17; E01B 29/24; E01B 29/32

See application file for complete search history.

(56) References Cited

U.S. PATENT DOCUMENTS

| | | | |
|---|---|---|---|
| 847,451 | A | 3/1907 | Wilmore |
| 1,953,818 | A | 4/1934 | Paridon |
| 2,341,265 | A | 2/1944 | Crawford |
| 3,063,543 | A | 11/1962 | Schneider |
| 3,552,539 | A | 1/1971 | Rutter |
| 3,589,531 | A | 6/1971 | Povlacs |
| 3,930,595 | A | 1/1976 | Formanski |
| 4,583,635 | A | 4/1986 | Timmer et al. |
| 5,038,914 | A | 8/1991 | Cotic et al. |
| 5,165,520 | A | 11/1992 | Herve et al. |
| 5,913,402 | A | 6/1999 | Sakota et al. |
| 6,564,925 | B1 | 5/2003 | Cadwallader et al. |
| 7,665,599 | B2 | 2/2010 | Stibbard |
| 9,016,208 | B2 * | 4/2015 | Coots ...................... E01B 29/32 104/16 |

(Continued)

FOREIGN PATENT DOCUMENTS

| | | |
|---|---|---|
| CA | 2810847 | 9/2013 |
| EP | 0192594 | 7/1989 |

(Continued)

OTHER PUBLICATIONS

Canadian Intellectual Property Office, Office Action for CA Patent App. No. 2,810,688 dated Sep. 28, 2016.
Transmittal Letter of Related Cases, May 17, 2017.

*Primary Examiner* — R. J. McCarry, Jr.
(74) *Attorney, Agent, or Firm* — Middleton Reutlinger

(57) ABSTRACT

Embodiments of a tie plate sorter are disclosed wherein the tie plates are sorted and fed to an output device for further feeding to a tie plate distribution system. The tie plates may be oriented as needed. Exemplary methods are also provided.

19 Claims, 17 Drawing Sheets

(56) References Cited

U.S. PATENT DOCUMENTS

| | | | | |
|---|---|---|---|---|
| 9,038,542 | B2 | 5/2015 | Coots | |
| 9,328,465 | B1 | 5/2016 | Coots | |
| 9,422,673 | B2 | 8/2016 | Coots | |
| 2004/0094188 | A1 | 5/2004 | Stalp | |
| 2009/0188406 | A1 | 7/2009 | Sperling | |
| 2011/0100248 | A1 | 5/2011 | Buckley et al. | |
| 2011/0146526 | A1* | 6/2011 | Plyler | B03C 1/20<br>104/2 |

FOREIGN PATENT DOCUMENTS

| | | | |
|---|---|---|---|
| EP | 0895949 | A1 | 2/1999 |
| EP | 0895950 | | 11/2004 |

* cited by examiner

TIE PLATE SEPARATOR AND METHOD THEREOF

CLAIM TO PRIORITY

This continuation patent application claims priority to and benefit under 35 U.S.C. 120 from currently pending U.S. patent application Ser. No. 13/428,809, filed on Mar. 23, 2012, all of which is incorporated by reference herein.

STATEMENT REGARDING FEDERALLY SPONSORED RESEARCH

None.

REFERENCE TO SEQUENTIAL LISTING, ETC

None.

BACKGROUND

1. Field of the Invention

An apparatus and method is taught for separating and sorting tie plates so that the tie plates may be sequentially fed to a tie plate distribution system. More specifically, an apparatus and method are taught for feeding a tie plate distribution system wherein said tie plates are separated and sorted mechanically rather than manually thereby improving efficiency of a tie plate distribution process.

2. Description of the Related Art

In current tie plate distribution systems, sorting and/or separating of tie plates, including orientation of the plates, is a highly manual endeavor. Workers stand along conveyors to lift, rotate and/or orient tie plates for proper feeding location. This typically requires two men on lower output machines and as many as six men on high output or high production machines.

Due to labor costs and a desire to eliminate job functions where lifting or other injuries might occur, it would be desirable to automate as many of these labor positions as possible.

Additionally, it would be desirable to increase the throughput of tie plates to increase efficiencies associated with distribution and therefore decrease the downtime of railroad tracks during maintenance periods when tie plate replacement is necessary.

SUMMARY

According to at least one embodiment, a tie plate sorter assembly comprises at least one generally cylindrical driving ring, at least one tie plate receiving side extending from adjacent the cylindrical driving ring, at least one magnet selectively operable and disposed adjacent the at least one tie plate receiving side, a tie plate input which provides tie plates to the tie plate receiving side when the tie plate receiving side is in one position, a tie plate output which receives sorted tie plates from the tie plate receiving side when the tie plate receiving side is in a second position. Optionally, the at least one generally cylindrical driving ring may have a first cylindrical drive ring and a second cylindrical drive ring. The first and second cylindrical drive rings may be disposed on tires wherein at least one of the tires is rotatably driven. The tie plate sorter assembly wherein the at least one of said tires may be driven by one of an electric or hydraulic motor. The tie plate sorter assembly wherein the one of an electric motor or a hydraulic motor is directly connected to the at least one of the tires. The tie plate sorter assembly wherein the one of an electric motor or a hydraulic motor is connected to the at least one of the tires by a transmission assembly. Optionally, the transmission assembly may be one of a chain drive, a belt drive, a gear drive, or a hydraulic transmission. The tie plate sorter assembly further comprises a chain drive having a drive sprocket extending about said tie plate sorter. The tie plate sorter assembly wherein the at least one tie plate receiving side forms a geometric shape and further wherein the geometric shape may be one of a circle, a polygon, a square, a rectangle, a quadrilateral, a trapezoid, a pentagon, a hexagon, and an octagon. The tie plate sorter assembly wherein each of the at least one tie plate receiving sides including at least one magnet. The tie plate sorter assembly wherein the at least one magnet is selectively powerable. The tie plate sorter assembly further comprises a power supply and a conductor which selectively powers the at least one magnet. The tie plate sorter assembly wherein the power supply is a metallic strip. The tie plate sorter assembly wherein the conductor engages the power supply dependent on a position of the receiver.

According to at least another embodiment, a tie plate sorter assembly for use on a tie plate distribution vehicle capable of operation on-road and on a railroad track, the vehicle having a bed and a crane comprises a tie plate receiver having a first driving ring and a second driving ring, at least one tie plate receiving side extending between the first driving ring and the second driving ring, the at least one tie plate receiving side substantially forming one of a circle or a polygon, at least one driving assembly causing cyclical motion of said at least one tie plate receiving side, at least one magnet disposed adjacent the at least one tie plate receiving side, said at least one magnet being selectively operable, a tie plate input which delivers tie plates to the tie plate receiver, and, a tie plate output which receives the tie plates from the tie plate receiver. The tie plate sorter assembly wherein the cyclical motion is rotational. The tie plate sorter assembly wherein the cyclical motion is bi-directional. The tie plate sorter assembly wherein the tie plate input enters in a first direction. The tie plate sorter assembly wherein the tie plate output exits in a second direction. The tie plate sorter assembly wherein the first direction and the second direction are linearly aligned. The tie plate sorter assembly wherein the first and second direction are non-aligned. The tie plate sorter assembly further comprises an electrical contact operably engaging the at least one magnet. The tie plate sorter assembly wherein the tie plate input is optionally one of a roller conveyor, a belt conveyor, a chute or a feeder.

According to a further alternative embodiment, a tie plate sorter assembly comprises a drive assembly for cyclical motion of a tie plate receiver, the tie plate receiver having at least one tie plate receiving side, at least one magnet disposed on the tie plate receiver, the magnet disposed selectively operable based upon a position of said at least one magnet, a tie plate input providing tie plates to the tie plate receiver, a tie plate output receiving tie plates from the tie plate receiver. The tie plate sorter assembly wherein the magnet is an electromagnet. The tie plate sorter assembly wherein the magnet is a dual pole bar magnet. The tie plate sorter assembly wherein the at least one magnet has at least one on position and at least one off position during movement of said tie plate receiver. The tie plate sorter assembly further comprising guides located along the at least one tie plate receiving side. The tie plate sorter assembly further comprises a catch disposed on an inside of the tie plate receiver. The tie plate sorter assembly further comprises a power supply to power the at least one magnet.

According to an exemplary embodiment, a method of separating tie plates comprises driving a tie plate receiver in a cyclical manner, receiving tie plates in the tie plate receiver, moving the tie plates from a first position to a second position in the tie plate receiver, selectively releasing the tie plates onto a discharge conveyor, moving the tie plates along the discharge conveyor. The method of separating tie plates wherein the cyclical manner is rotational. The method of separating tie plates further comprises driving the tie plate receiver in at least two directions. The method of separating tie plates further comprises selectively retaining the tie plates. The method of separating tie plates further comprises driving the tie plate receiver with a hydraulic assembly. The method of separating tie plates further comprises driving the tie plate receiver with one of a pneumatic, hydraulic or electric motor. The method of separating tie plates further comprises rotating at least one tire with the at least one hydraulic or electric motor. The method of separating tie plate further comprises receiving the tie plates at a lower position of the tie plate receiver and electromagnetically releasing at least one of the tie plates at a higher position of said tie plate receiver. The method of separating tie plates further comprises actuating an electromagnet between an on condition and an off condition. The method of separating tie plates further comprises changing orientation of the tie plates on a discharge conveyor.

According to a further exemplary embodiment, a method of separating tie plates for feeding to a distribution conveyor comprises driving a tie plate receiver cyclically, feeding a plurality of tie plates to the tie plate receiver, moving the plurality of tie plates from a first position to a second position during the cyclical driving, and, releasing the plurality of tie plates on to an exit conveyor at the second position. The method wherein the feeding occurs with an entrance conveyor. The method further comprises operating the entrance conveyor and the exit conveyor in a single direction. The method wherein the releasing comprises powering off a magnet. The method wherein the moving comprises powering a magnet to carry the plurality of tie plates from the first position to the second position. The method wherein the driving occurs by at least one drive tire engaging a driven ring on the tie plate receiver.

According to an alternate embodiment, a tie plate sorter assembly comprises a first substantially cylindrical driving ring and a second cylindrical driving ring, at least one tie plate receiving surface extending between the first and second substantially cylindrical driving rings, the at least one tie plate receiving surface having at least one pass through aperture for allowing at least one tie plate to pass from an interior of the sorter to an exterior, a retaining mechanism engaging the at least one tie plate receiving surface for retaining the at least one tie plate until the tie plate is released. Optionally, the tie plate sorter assembly further comprises a pocket adjacent the at least one pass through aperture. The tie plate sorter assembly wherein the at least one retaining mechanism is magnetic. The tie plate sorter assembly wherein the at least one retaining mechanism is electromagnetic. The tie plate sorter assembly wherein the at least one retaining mechanism is actuated depending on the position of the tie plate sorter. The tie plate sorter assembly wherein the at least one retaining mechanism is actuated electrically. The tie plate sorter assembly wherein the at least one retaining mechanism is actuated mechanically.

According to a further embodiment, a tie plate sorter assembly, comprises a tie plate receiver having a first end and a second end, at least one location for receiving tie plates into said tie plate receiver, the tie plate receiver having at least one side wherein tie plates are deposited, the tie plate receiver having at least one aperture discharging tie plates. The tie plate sorter assembly further comprises a mechanical structure to engage or disengage a magnet. The magnet may retain the tie plates in the receiver until the magnet is disengaged. The tie plate sorter assembly further comprises an electromagnet. The tie plate sorter assembly further comprises a pocket wherein at least one of the plurality of tie plates is seated. The tie plate sorter assembly wherein a magnet is positioned adjacent the pocket. The tie plate sorter assembly wherein the aperture is formed in the pocket area.

According to still a further embodiment, a tie plate sorter assembly comprises a tie plate receiver having a first end and a second end, an input location for tie plates into the tie plate receiver, a plurality of circumferentially spaced pockets about the receiver, a retaining mechanism located at the pocket to retain at least one of the tie plates in the pocket, an aperture in the pocket to selectively release the at least one tie plate. The tie plate sorter assembly wherein the aperture discharges the at least one tie plate externally of the receiver. The tie plate sorter assembly further comprises a conveyor to receive the discharged at least one tie plate. The tie plate sorter assembly wherein the pockets extend in an axial direction.

According to some embodiments, a method of separating tie plates comprises rotating a tie plate receiver, receiving tie plates in the tie plate receiver, magnetically retaining the tie plates at a first location, and, magnetically releasing the tie plates at a second location. Optionally, the releasing may be on to a discharge conveyor. The discharge conveyor may be exterior of the tie plate receiver. The magnetically retaining may comprise engaging the tie plate with a permanent magnet. The magnetically releasing may comprise moving a permanent magnetic. The magnetically retaining may comprise powering on an electromagnet or powering off the electromagnet. The first location may be a first rotational position. The second location may be a second rotational position. The releasing causing the tie plates to move on to a conveyor.

According to an alternate embodiment, a method of separating tie plates comprises rotating a tie plate receiver, depositing tie plates within the tie plate receiver, magnetically retaining each of the tie plates at a first location, moving each of the tie plates to a second location, magnetically releasing the tie plates at the second location. Optionally, the magnetically releasing positions the tie plate on to a conveyor. The magnetically retaining positions the tie plate against a surface of the tie plate receiver. The magnetically retaining and the magnetically releasing may be with a permanent magnet. The method may further comprise moving the permanent magnet relative to the tie plate receiver. The magnetically retaining and the magnetically releasing may be with an electromagnet. The method further comprising powering on and off said electromagnet.

According to still further embodiments, a method of separating tie plates comprises rotating a tie plate receiver, feeding tie plates in the tie plate receiver, magnetically retaining the tie plates at a first position, moving the tie plates to a second position during the rotating, and, releasing the tie plates at the second position. The releasing may be on to a conveyor. The magnetically retaining may be by one of a permanent magnet and an electromagnet.

BRIEF DESCRIPTION OF THE DRAWINGS

In order that the embodiments may be better understood, embodiments of the tie plate sorter in accordance with the present invention will now be described by way of examples. These embodiments are not to limit the scope of the present claims as other embodiments of the tie plate sorter will become apparent to one having ordinary skill in the art upon reading the instant description. Examples of the present embodiments are shown in figures wherein:

DETAILED DESCRIPTION

Figure 1:
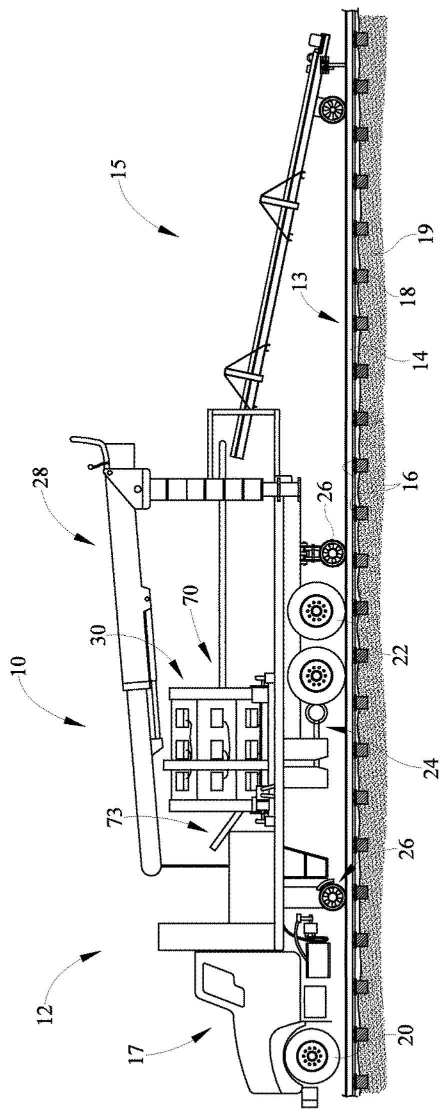
FIG. 1 depicts a side view of a first embodiment of a tie plate separator or sorter assembly and distribution conveyor.

It is to be understood that the tie plate sorter assembly is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numeral indicate like elements throughout several views, there are shown in FIGS. 1 through 19 various aspects of a tie plate separator or sorter assembly which receives a plurality of tie plates and positions the tie plates sequentially on an exit conveyor for subsequent feeding to a tie plate distribution system. A method is further shown herein for performing the function described with the various structures disclosed.

Referring initially to FIG. 1, a side view of a tie plate sorter assembly 10 positioned on a hi-rail truck 12 for separating a plurality of tie plates positioned on the truck by a crane or other loading structure 28 and feeding a tie plate distribution system 15.

The tie plate separator or sorter assembly 10 is mounted on a truck or other vehicle 12 having capability of operating on a road or on a railroad track 13, as shown. The railroad track 13 includes a pair of rails 14 disposed on tie plates 16. The tie plates 16 are positioned on the railroad ties 18 which extend generally perpendicular below the rails 14. The tie plates 16 connect the rails 14 to the railroad ties 18. The railroad ties 18 are positioned in ballast 19 which may be formed of various substrates which typically include some amount of gravel or rock.

Figure 10:
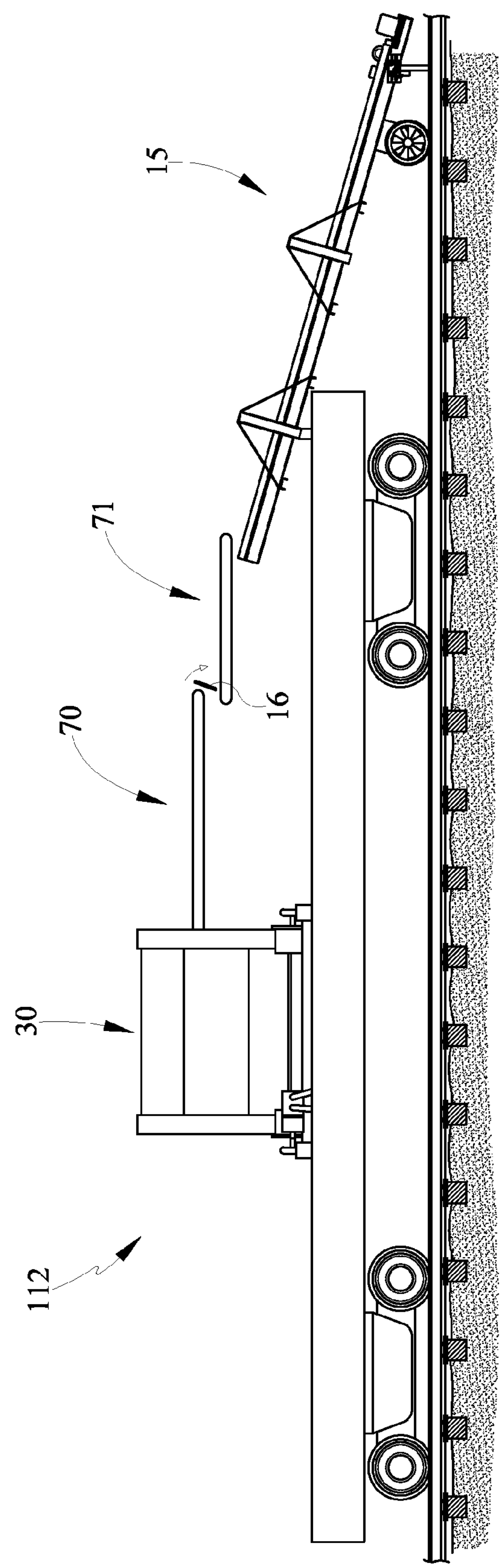
FIG. 10 and alternate vehicle for moving an exemplary tie plate sorter.

The truck 12 includes the front road tires 20 and at least one set of rear road tires 22. An engine and transmission connected to the rear road tires 22 provide propulsion for both on road and railway travel, according to the instant embodiment. The vehicle 12 also includes rail wheels 26 which allow movement along rails 14 by way of propulsion from at least one of the front and rear tires 20 and 22. The truck 12 includes an auxiliary drive system 24 which also allows the vehicle to operate on the railroad tracks through the use of additional railwheels 26 shown. A crane 28 is located at the rear of the bed of the truck 12 for loading materials onto the truck 12 as well as clearing debris from railway worksites as needed. As shown in FIG. 10, an alternative vehicle 112 is depicted. The vehicle 112 is a flatbed cargo vehicle for train track 13 usage. The vehicle 112 is typically used for higher output tie plate production systems. In operation, vehicle 112 may follow behind vehicle 12, or other pulling vehicle, engine or tractor, so as to receive tie plates from crane 28. These vehicles should not be considered limiting as various types of vehicles may be utilized.

The tie plate separator assembly 10 includes a tie plate receiver 30 which operates in a cyclical manner to receive tie plates at one location and move the tie plates to a second location for depositing on a tie plate distribution system 15. The separator assembly 10 further includes a drive assembly 50 (FIG. 3) which causes cyclical motion of the receiver 30 to separate or sort the tie plates for positioning on an exit conveyor. The receiver 30, according to the instant embodiment, rotates about an axis which is parallel to the longitudinal axis of the truck 12, i.e. extending from the front tires 20 to the rear tires 22. The tie plate receiver 30 receives tie plates from input 73 and moves the tie plates from the receiver 30 by output 70. The input 73 may be formed of various roller, powered, vibrating, or gravity feed structures.

The feed or input structure 73 may have a switch or other control structure for limiting the flow of tie plates 16 into the receiver 30.

Figure 2:
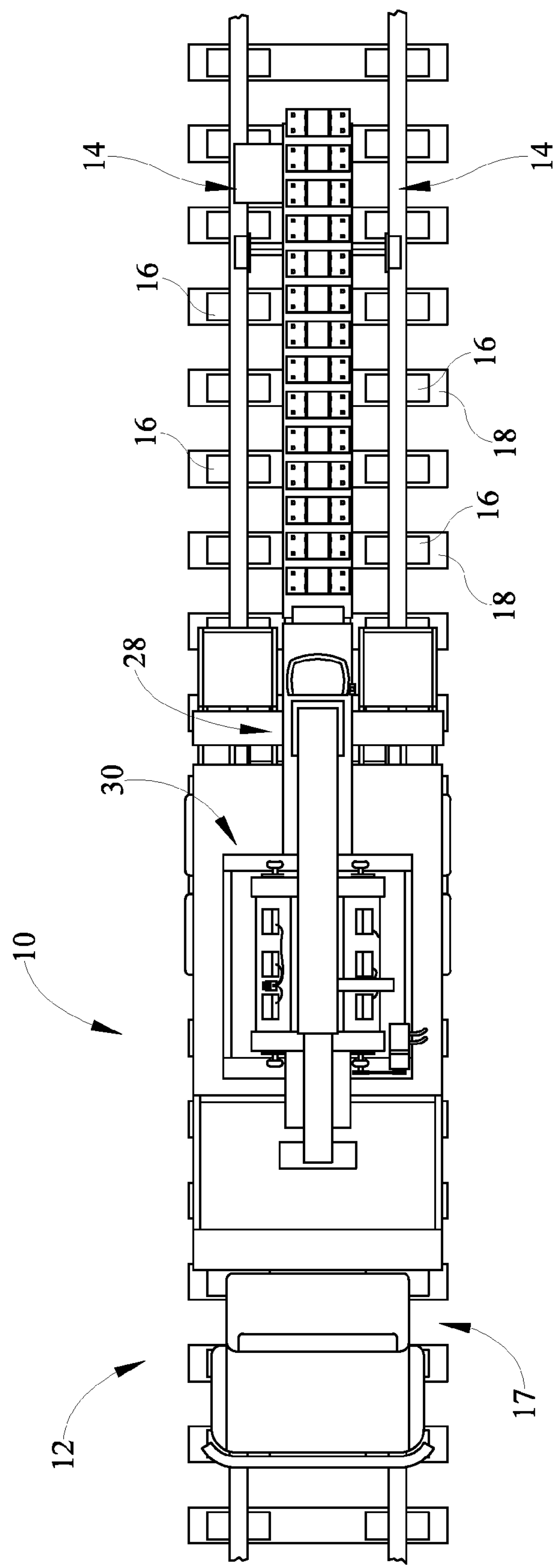
FIG. 2 depicts a top view of the embodiment of FIG. 1.

Referring now to FIG. 2, a top view of the truck 12 with the tie plate separator 10 is depicted. At a forward end of the truck 12 is the operating cab 17 wherein a driver can operate the truck 12 while in use during on road travel, and in order to position the truck 12 on the railroad track 13. Once the truck 12 is positioned on the track 13, the operator may move to a rear or cab area where the engine speed, auxiliary drive 24 and crane 28 may be controlled in order to propel the truck along the rails 14 and move tie plates 16 for processing in the receiver 30.

According to one embodiment of the tie plate separator assembly 10, the tie plates 16 are received by the receiver 30 at the vehicle forward end of the receiver 30 and are directed towards the rear of the vehicle 12 after the tie plates 16 are oriented in the tie plate receiver 30. The crane 28 feeds tie plates 16 to a plurality of feed devices such as a hopper, a vibrating feeder, a feed chute, a roller or belt conveyor or other structure which feeds the receiver 30.

Figure 3:
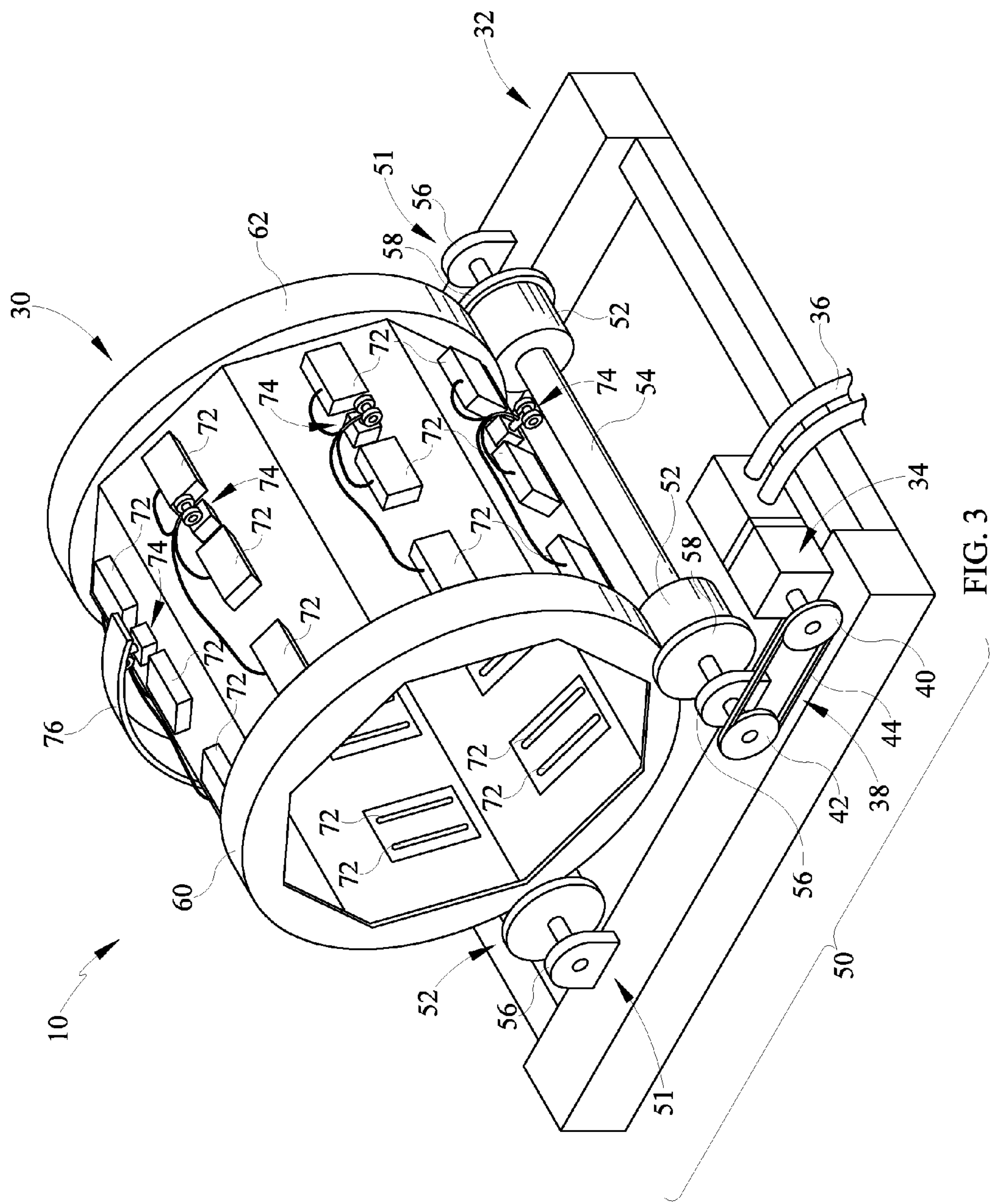
FIG. 3 depicts a perspective view of the tie plate sorter assembly removed from a tie plate distribution vehicle.

Referring now to FIG. 3, the tie plate separator 10 is shown including the receiver 30 and a drive assembly 50 positioned on a frame 32. Positioned on or adjacent to the frame 32 is a motor 34 which is powered by a power supply 36. The motor 34 may be electric or alternatively may be hydraulic. The power supply 36 therefore may be electric or may be a fluid supply utilized to rotate the hydraulic motor. Various power supplies may be used and exemplary descriptions should not be considered limiting.

In addition to the motor 34, the drive assembly 50 further comprises a transmission 38. The transmission 38 is shown including sheaves 40, 42 and a belt 44. The sheaves 40, 42 receive the belt 44 and together transfer torque from the motor 34 to at least one tire 52. Alternative drives may be utilized, however. For example, gear drives, chain drives or other transmissions may be utilized. The chain drive sprockets may replace sheaves 40, 42. Alternatively, a chain sprocket may extend about the receiver 30 and an adjacent sprocket may be positioned on a motor or transmission in order to turn the receiver 30 by way of a chain extending around both sprockets.

The drive assembly 50 further comprises tire assemblies 51, each having first and second tires 52 spaced apart along the axle 54. The tires 52 may be metallic, rubber, composite or other materials. The assemblies 51 are connected to the frame 32 by opposed bearings 56 between which the axle 54 extends. As shown in the exemplary embodiment, the device includes first and second tire assemblies 51 spaced apart to rotatably locate the receiver 30. In order to operate, the motor 34 is powered for rotation, causing rotation through the transmission 38 and tires 52. With rotation of the adjacent at least one drive ring, for example drive rings 60 and 62, opposite tire assembly 51 is also driven which allows for guided rotation of the receiver 30. While one tire assembly 51 is shown being driven by the motor 34, alternate embodiments may be provided wherein both tire assemblies may be driven.

Figure 4:
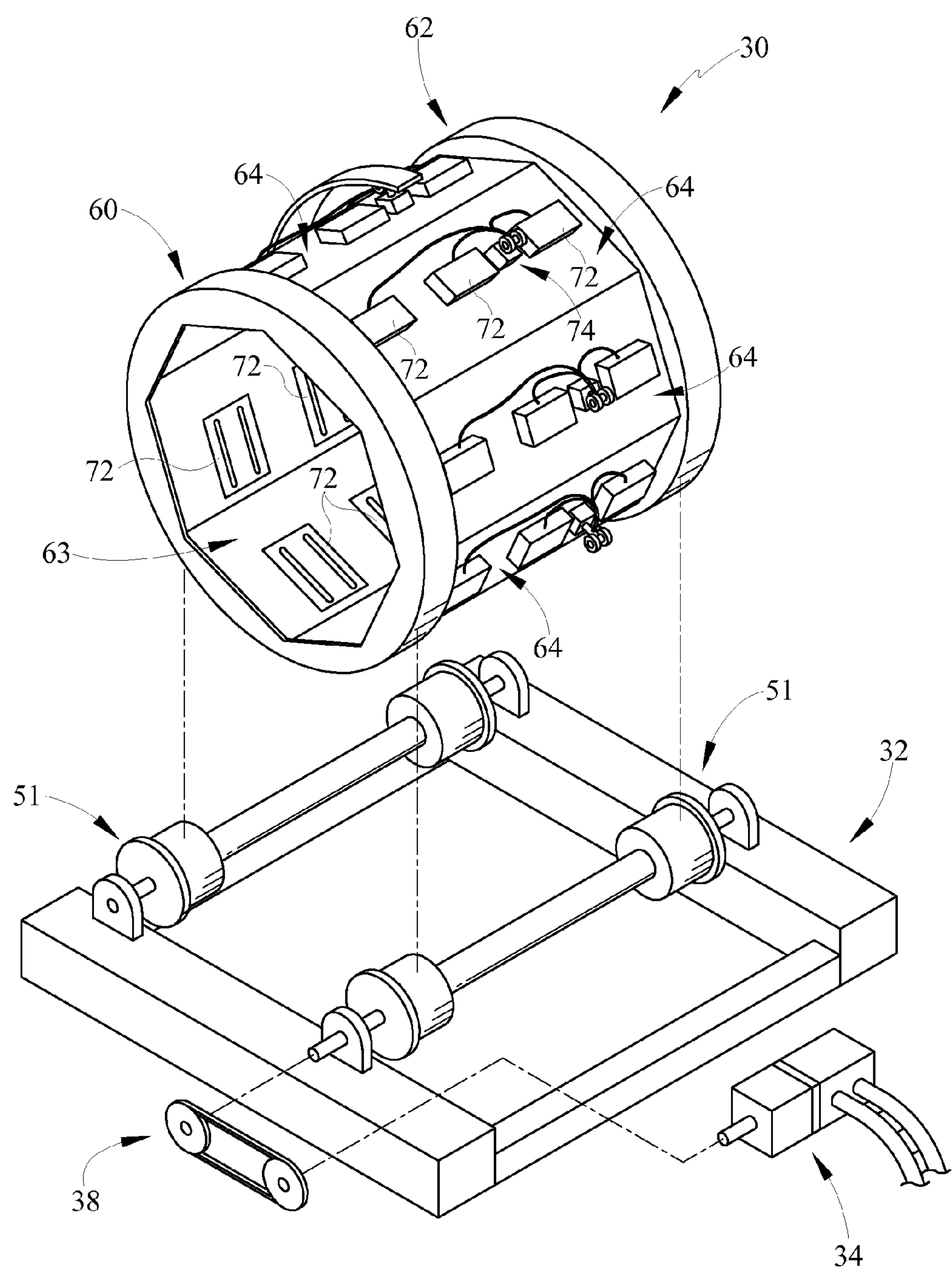
FIG. 4 refers to an exploded perspective view of the embodiments shown in FIG. 3.
Figure 5:
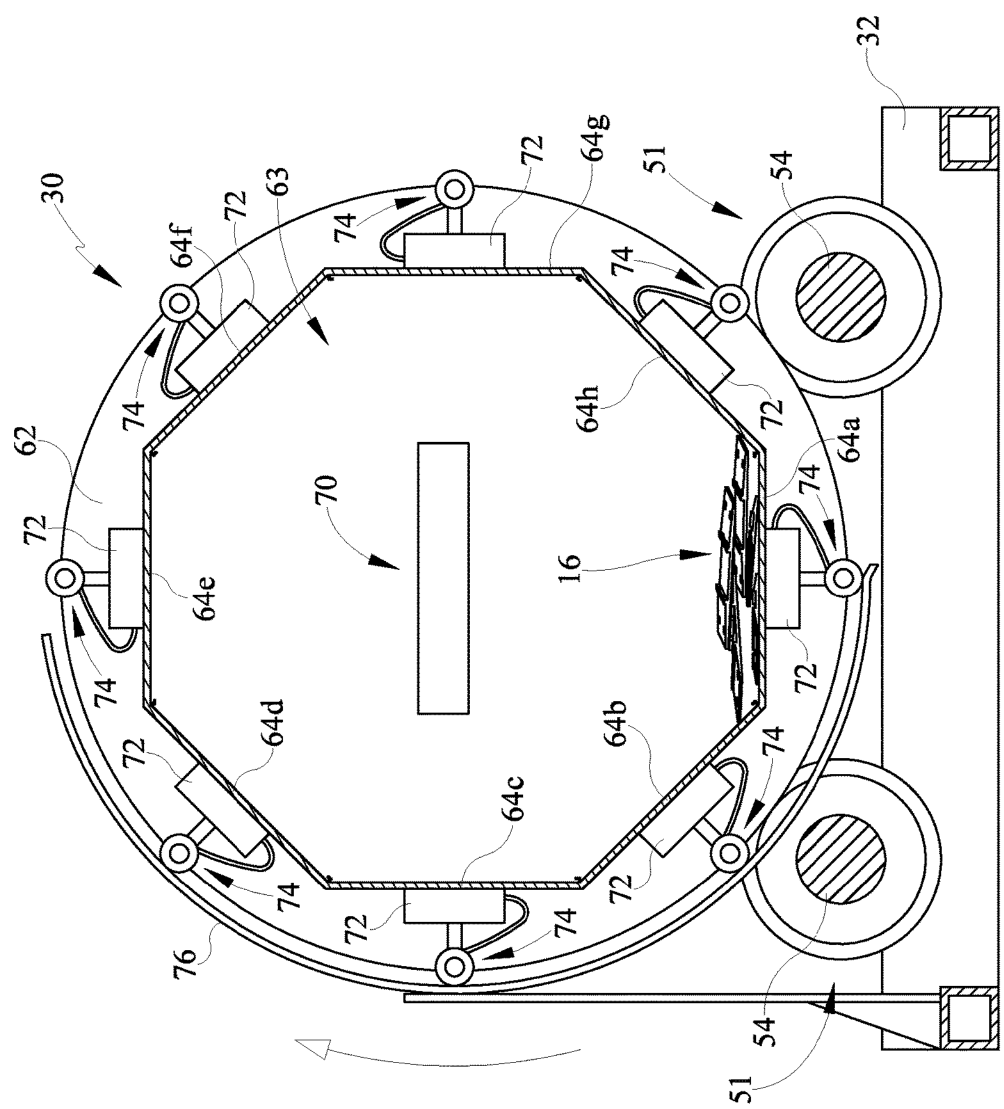
FIG. 5 depicts an end view of the tie plate receiver having a plurality of tie plates therein.

Referring now to FIG. 4, the receiver 30 is exploded from the frame 32 and the tire assemblies 51. Extending between a first drive ring 60 and a second drive ring 62 is at least one side 64. The at least one side 64 defines a geometric shape as best shown in FIG. 5 when viewed from an end of the receiver 30. The exemplary design utilizes an octagonal shaped hollowed area 63 of the receiver 30 which is formed by the eight sides 64. The hollow area 63 receives tie plates 16 from a feed device and feeds out separated tie plates via an exit or output conveyor 70. Alternatively, various shapes may be utilized which may be moved in cyclical fashion. For example, polygons, circles, curvilinear sides and other shapes may be used.

Referring still to FIG. 4, on or in each side 64 is at least one magnet 72. According to the exemplary embodiment, the magnets 72 are positioned on the outer surface of side 64 and apertures are cut in the sides 64 so that the magnetic force can retain tie plates 16 on the inside of the receiver 30. Other arrangements are contemplated however, dependent on the force attainable with the magnets. The exemplary magnets 72 are dual pole magnets however alternative magnets may also be utilized. Each of the magnets 72 retain at least one tie plate 16 against a side 64 during the rotation of the receiver 30 on the tire assemblies 51. The magnets 72 move with rotation of the receiver 30 so that magnetically retained tie plates are moved from the lower side of the receiver 30 to the upper side during the rotation. This causes loose tie plates to separate from the magnetically retained tie plates 16 which are held tightly by the electromagnetic force. As the receiver 30 rotates, the magnets 72 retain and move at least one tie plate 16 toward a discharge position. At such discharge position, the tie plates 16 are released on to a tie plate output 70, such as the exemplary conveyor. Other embodiments may be used. For example, although the magnets are shown inside receiver 30 with long side extending in a circumferential direction the receiver 30, the magnets 72 may be rotated so that the long side extends in an axial direction. Additionally, although magnets 72 are shown on each surface of the receiver 30, the magnets may be spaced to every other surface of the receiver or further depending on the desired throughput. Even further, the magnets 72 may be spaced in the axial direction of the receiver as well. Although three magnets 72 are shown in an axial direction, more magnets 72 may be used or fewer may be utilized.

Referring now to FIGS. 5 through 10, the receiver 30 is shown in a sectional end view moving through multiple positions due to cyclical motion of the tire assemblies 51. As previously described, the receiver 30 rotates in clockwise direction according to the exemplary views, so that the tie plates 16 deposited in the receiver 30 are moved toward the top of the receiver 30. When located at the top of the receiver, the tie plates 16 are transferred to a tie plate output 70. Since all of the lifting and positioning occurs in automated fashion, the structure and process provides for decrease in manual handling which results in decreased lifting injury. Also, the process results in increased efficiency, increased throughput of tie plates and ultimately decreased operating costs. In the FIGS. 5-10, the sides 64 are labeled **64*a*-64*h* for ease in distinguishing movement of the receiver 30**.

In FIG. 5, the tie plates 16 are deposited on a tie plate receiver side **64*a* at a first position. This first position is a lowermost position for the specific side 64*a* described herein. The tie plates 16 may be delivered in a multitude of manners including a conveyor, a vibrating feeder, a chute or any of a variety of means in order to deposit tie plates 16 on the side 64*a*. Moreover, the tie plates 16 need not be deposited at the lowermost surface but may be positioned at a multitude of positions within the receiver 30. As shown in the Figure, the side 64*a* has a magnet 72 on an outer surface. Adjacent the magnet 72 is a conductor 74 which engages a power supply 76 extending about the receiver 30. The power supply 76 is a copper or other conductive strip or band in the exemplary embodiment; however, other structures may be utilized to provide power to the conductor 74. The power supply 76 may be charged by a battery, an alternator which may be connected to a hydraulic motor, a generator or other means. The magnet 72 is powered by the conductor 74, which is powered by the power supply 76. The power supply 76 is shown in the axial center of the receiver 30. However, as shown in other embodiments, the power supply 76 may be at axial ends of the receiver 30 or any position therebetween. The magnet 72 provides force sufficient to retain at least one tie plate 16, as previously described. According to the exemplary embodiment, each side 64***a*-64*h* includes a magnet 72. However, magnets 72 may be spaced on consecutive surfaces, alternating surfaces or as needed for desired output of tie plates 16. As shown in FIG. 3, the power supply 76 is depicted generally centrally positioned relative to the axial direction of the receiver 30. However, the structure 76 may be moved to axial ends of the receiver 30 or any position there between. Additionally, the power supply 76 may be located at ends as long as pathways are provided for feed and output structure 70.

Figure 6:
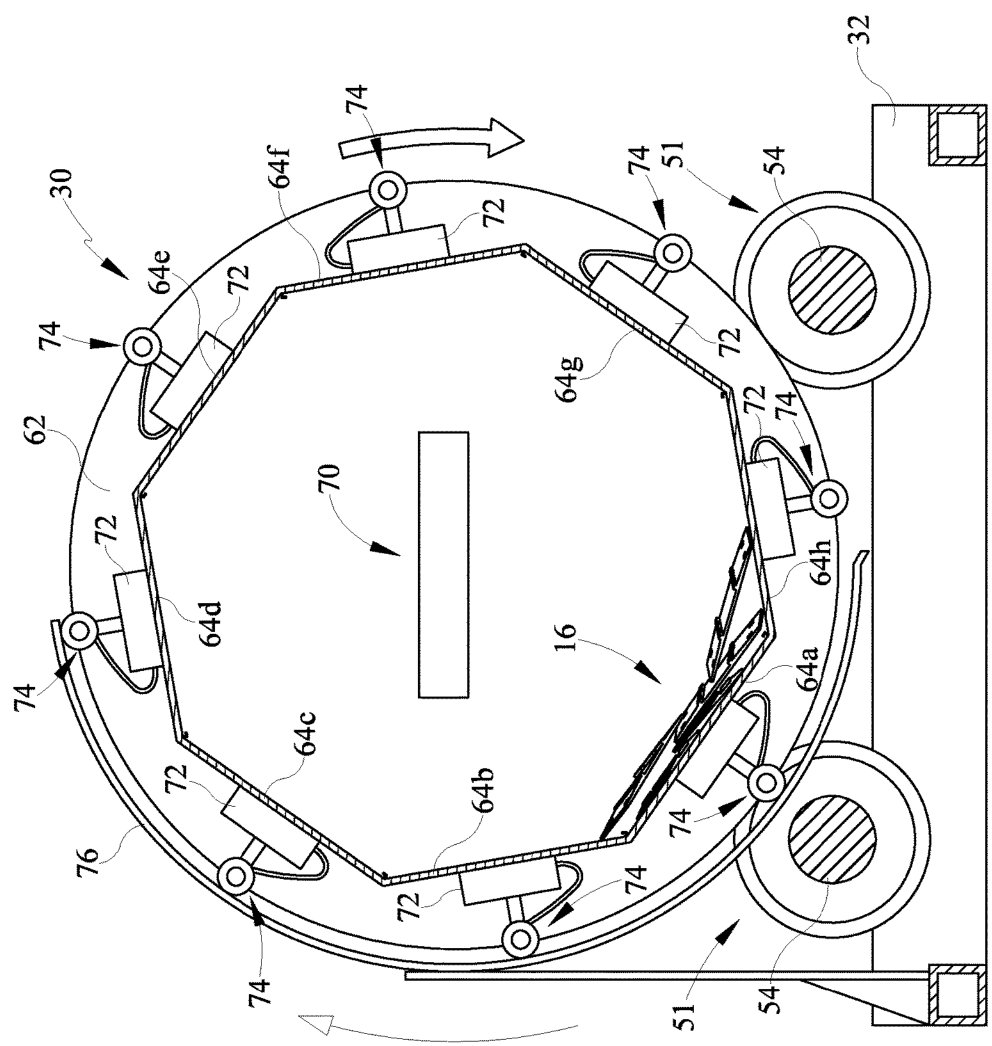
FIG. 6 depicts an end view of the tie plate receiver rotated through an arcuate distance from the position shown in FIG. 5.

With reference now to FIG. 6, as the tire assemblies 51 rotate in a counterclockwise direction, this causes clockwise rotation of receiver 30. The side 64*a* moves from a lowermost position (FIG. 5) to a position upwardly from that, as shown in FIG. 6. The tie plates 16 which are located against the surface 64*a* are held in position by the magnets 72. The conductor 74 continues to move with the rotation of the receiver 30. During the rotation, the conductor 74 stays in contact with the power supply 76 so that the magnet 72 continues to retain at least one tie plate 16 on surface 64*a*. As the rotation occurs, at least one tie plate 16 which is not immediately adjacent the magnet 72 will typically fall downward due to gravity to a lower surface 64*h* of the receiver 30. As tie plate 16 slides downward and engages at least one exposed magnet 72 on subsequent side 64*h*, the tie plate 16 will be retained as the receiver 30 continues rotation.

Figure 7:
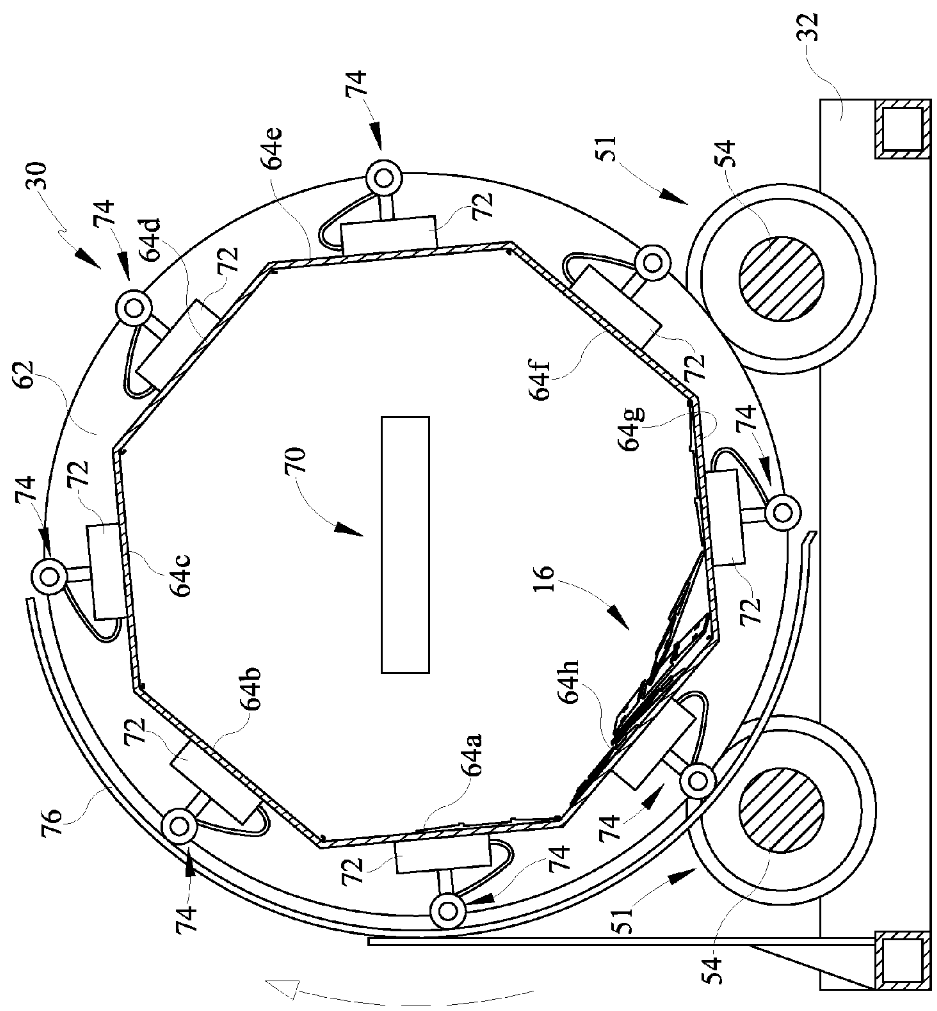
FIG. 7 depicts an end view with the tie plate receiver rotated further from the position depicted in FIG. 6.

Referring to FIG. 7, the tie plate 16 continues moving in the clockwise direction with rotation of the receiver 30. The conductor 74 maintains engagement with the power supply 76. The side 64*a* is vertically oriented due to the rotation of the receiver 30. On side 64*a*, a single tie plate 16 is held in position by the magnet 72, while all loose tie plates 16 have fallen downward toward the lower adjacent side 64*h* of the receiver 30. A majority of the tie plates 16 are disposed on side 64*h*. In the stack of tie plates 16 on surface 64*h*, the lowermost tie plate 16 adjacent the surface 64*h* will be held by the magnetic force while the remainder of plates may be loosely in position and will fall as rotation continues. At the lowermost side 64*g*, one tie plate 16 is disposed in the lowermost position of the receiver 30 having fallen from either or both of sides 64*a* and 64*h*. The tie plates 16 are held by electromagnetic force against the surface indicated while other tie plates slide toward the lower adjacent side 64*g* with continued rotation. The retaining force is available due to the engagement between the conductor 74 and the power supply 76. However, other selectively operable retaining mechanisms or forces may be used. For example, pockets which catch and hold the loose tie plates 16 may be utilized to release the tie plates 16 at an appropriate location. Additionally, pockets, guides, catches, lips or the other structures, including but not limited to those shown in FIGS. 11, 15 and 17 may also be utilized.

Figure 8:
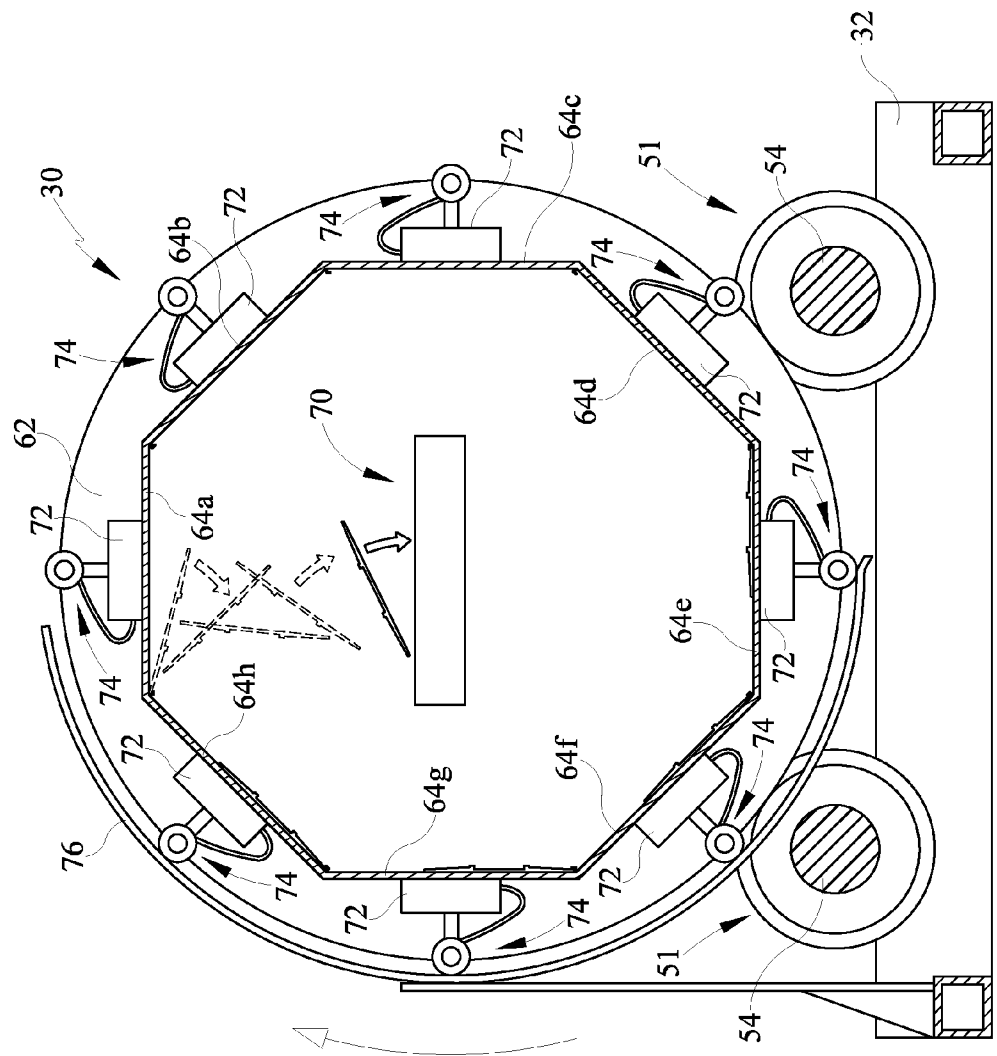
FIG. 8 depicts an end view of the tie plate sorter rotated even further from the position depicted in FIG. 7 and a tie plate falling onto an exit conveyor.

As shown in FIG. 8, the side 64*a* is disposed horizontally at the top of the cyclical rotation of the receiver 30. The conductor 74 of side 64*a* is disengaged from the power supply 76. With the magnets 72 of side 64*a* discharged, the tie plates 16 are released. Thus depending on the position of the receiver 30 or the magnets 72, the tie plates 16 are released. Since the side 64*a* is above the output conveyor 70, the tie plates 16 are released and begin to fall toward the output conveyor 70. One tie plate 16 is shown moving downward and rotating during the fall from the top uppermost surface 64 to an output conveyor 70. The tie plate output conveyor 70 moves the tie plates 16 out of the receiver and toward a tie plate distribution system 15 (FIG. 1) utilized with the vehicle 12. It may be also desirable to facilitate a complete discharge of the magnets 72 so as to release any dust or metallic debris which may delay or inhibit release of the tie plates 16. One such structure may be a rectifier but such device should not be considered limiting as various discharge devices may be utilized.

Figure 9:
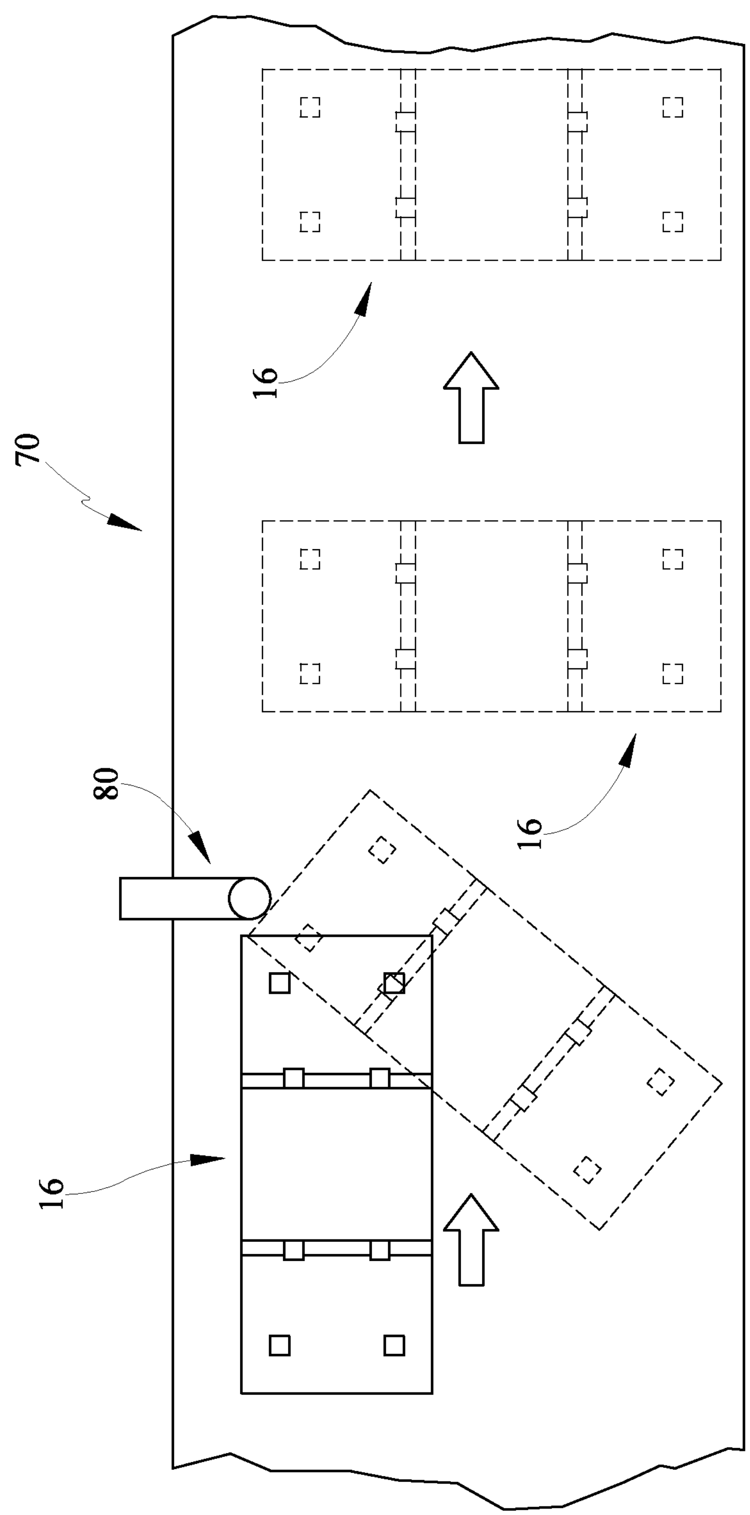
FIG. 9 depicts a top view of an exit conveyor wherein the tie plate orientation is changed if necessary.

Referring now to FIG. 9, a top view of the output conveyor for tie plate output 70 is shown. As depicted in the figure, a tie plate 16 is disposed at the left hand end of the segment of conveyor 70. The tie plate 16 engages an orientation structure 80. The exemplary embodiment utilizes a post 80 to cause rotation of the tie plate 16 about a vertical axis as the tie plate 16 moves with the output conveyor 70. The rotation of the tie plate 16 is shown in broken line as the tie plate 16 engages the orientation structure 80 causing the rotation about a vertical axis. With further movement of the conveyor 70, the orientation moves about 90 degrees from a longitudinal alignment with the conveyor to an orientation which is generally perpendicular to the longitudinal axis of the conveyor 70. Additionally, the orientation of the tie plates 16 may need to be rotated about a horizontal axis. In other words, it may be desirable to rotate the tie plate from the bottom surface as shown in FIG. 9 to the top surface. One method of doing this is to drop the tie plates from one conveyor to a second conveyor allowing the tie plate to flip or rotate about the horizontal axis. As shown in FIG. 10, output conveyor 70 drops to a secondary output conveyor 71. This causes rotation of the tie plate 16 from one surface to a second surface. The height differential of the space between conveyor 70 and 71 may be adjusted so as to allow for rotation to the appropriate side desired. Thus, with the tight spacing between the layers, a tie plate may not be allowed to rotate or with a wider spacing, the tie plate may be able to rotate 180 degrees so as to flip sides for feeding through the tie plate distribution system 15. This will be partially dependent on tie plate dimensions as will be understood by one skilled in the art.

Figure 14:
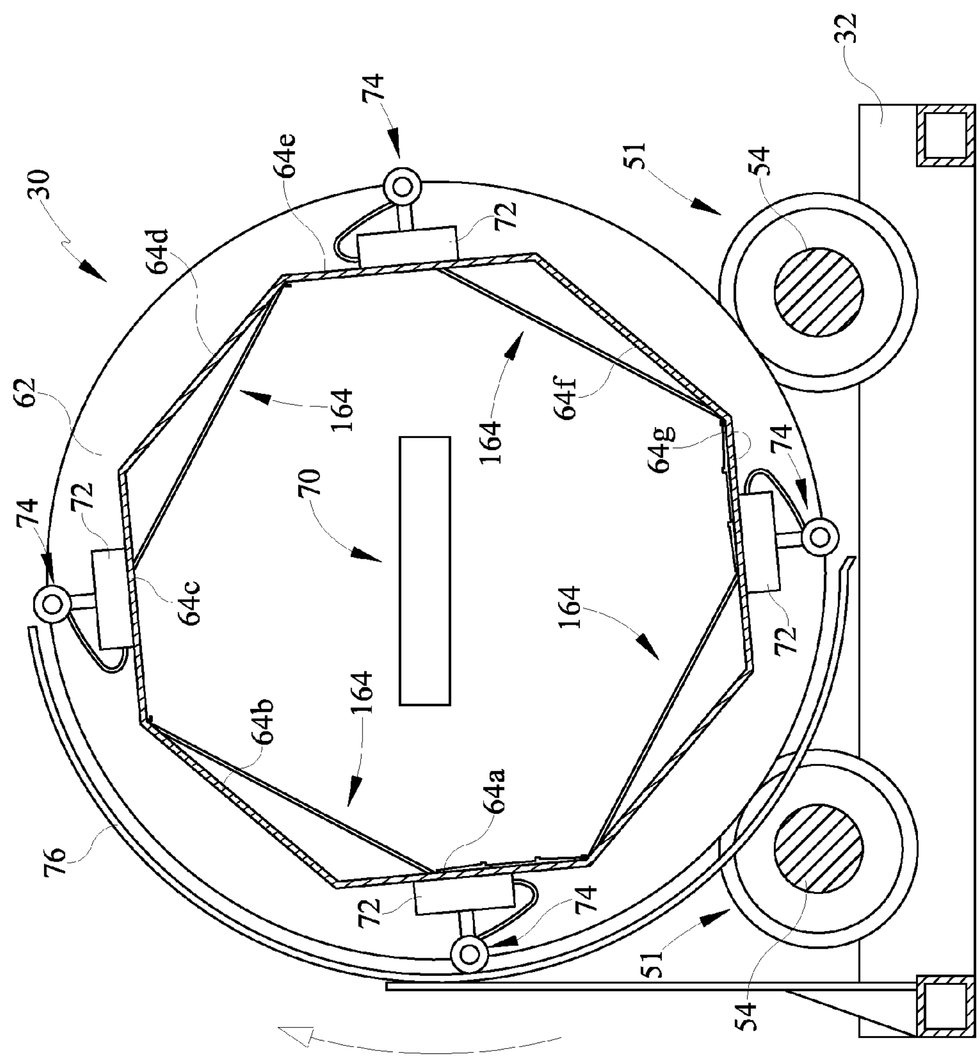
FIG. 14 depicts an end view of an alternative receiver with at least one slide surface.

Additional embodiments are shown, with reference to FIG. 14, depicting that the magnets 72 may also be spaced apart at further distances than every surface 64 of the receiver 30. For example, the magnets 72 maybe spaced at every other surface as shown, or at farther distances. According to a further embodiment shown, a sliding surface 164 may be positioned between, for example, surfaces 64*a* and 64*g*. The sliding surface more closely approximates a circular surface upon which the plates 16 may slide rather than fall to surface 64*g* where the at least one magnet 72 is positioned. This surface 164 allows for quieter movement of tie plates 16 and may be used between immediately adjacent surfaces or where magnets 72 are spaced apart at farther distances as shown. Other arrangements of slide surfaces may be utilized and should be considered within the scope of this disclosure.

Figures 15, 16:
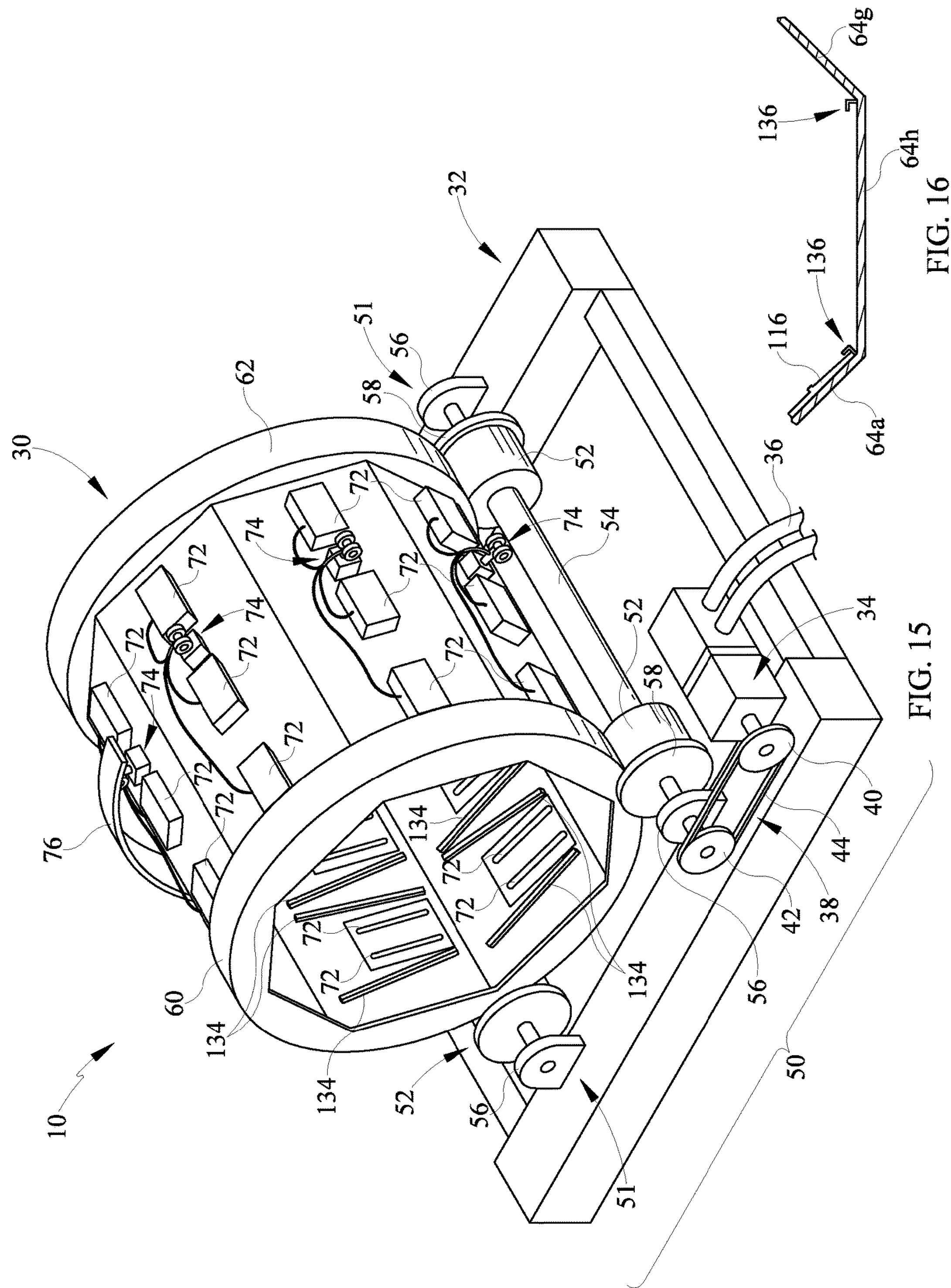
FIG. 15 depicts a perspective view of an embodiment wherein guides are located within the receiver.
FIG. 16 depicts an end view of a receiver wherein a catch is disposed in the receiver.

As further depicted in FIG. 15, guides 134 may be utilized in the receiver 30. The guides 134 may be positioned to locate tie plates 16 into a desired orientation and position. Additionally, the guides 134 may further limit the capture of more than one tie plate by any magnet 72. The guides may be welded or fastened and may be oriented to provide a multitude of tie plate 16 orientations. Therefore the embodiment shown should not be considered limiting.

As shown in FIG. 16, an end view of the receiver 30 is depicted wherein the catches 136 are depicted. These catches 136 receive ends of the tie plates 16 and cause the tie plate 16 to flip when the tie plate 16 is released from the top of the receiver 30 revolution. The flip of the tie plate 16 may be desirable when a desired orientation is needed and the normal release of the tie plate 16 from the receiver magnet 72 does not result in such orientation. The catch 36 may be formed of various structures, such as for example angle iron, and may be attached in a variety of manners.

Figure 11:
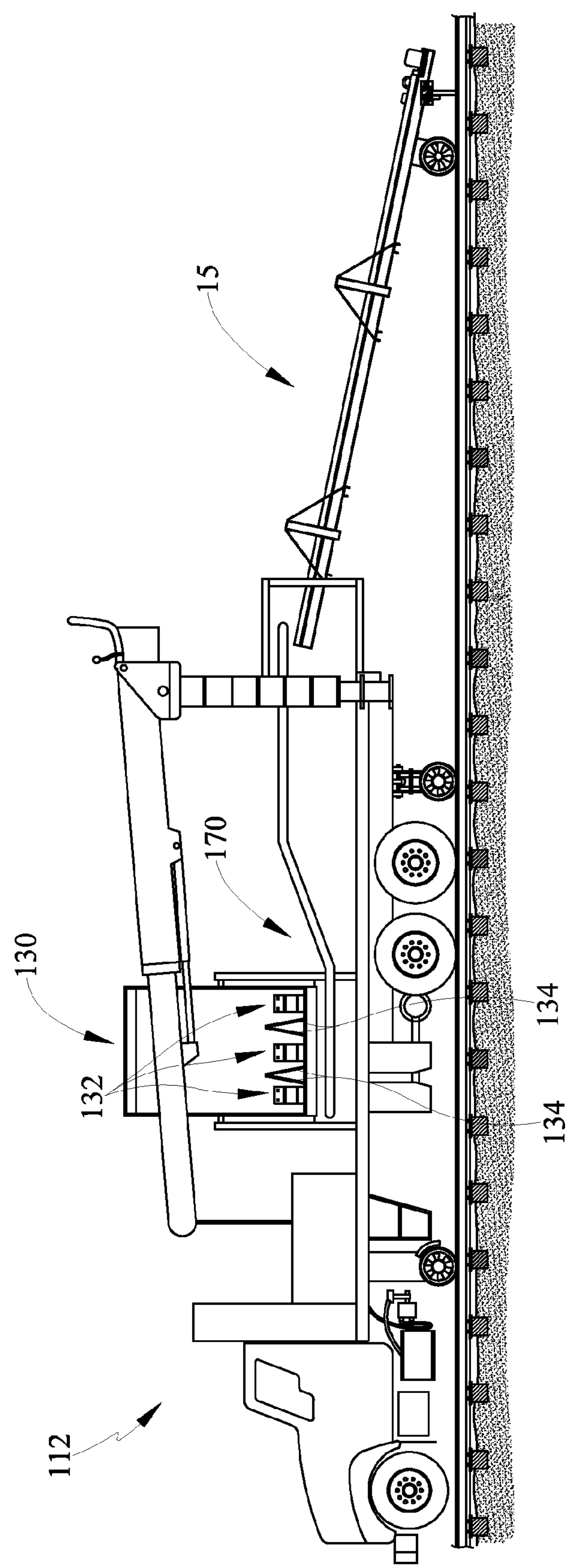
FIG. 11 depicts an alternate embodiment of a further cyclical operating tie plate receiver and sorter assembly.

Referring now to FIG. 11, a secondary embodiment of the invention is shown. In this embodiment the receiver 130 does not rotate in a circular motion, but instead has a cyclical motion which is in two directions. As shown, the tie plate receiving structure 130 includes a plurality of pockets 132 defined by guides 134. In these pockets 132, tie plates are disposed and a magnet may be utilized on the backside of the receiver structure 130 to retain the tie plate 16 in a position indicated. From this position the magnet may be released and the tie plate falls onto the conveyor 170.

Figure 13:
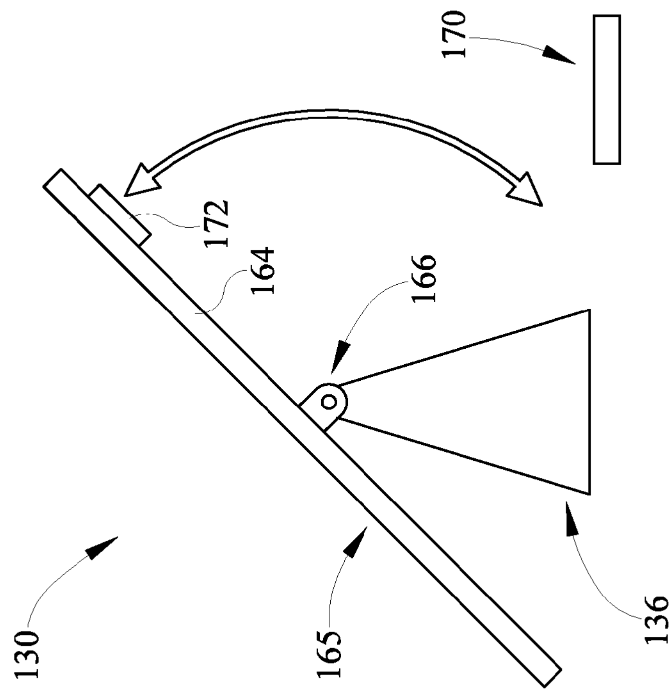
FIG. 13 depicts a side view of the alternate tie plate sorter of FIG. 11 in a second position.
Figure 12:
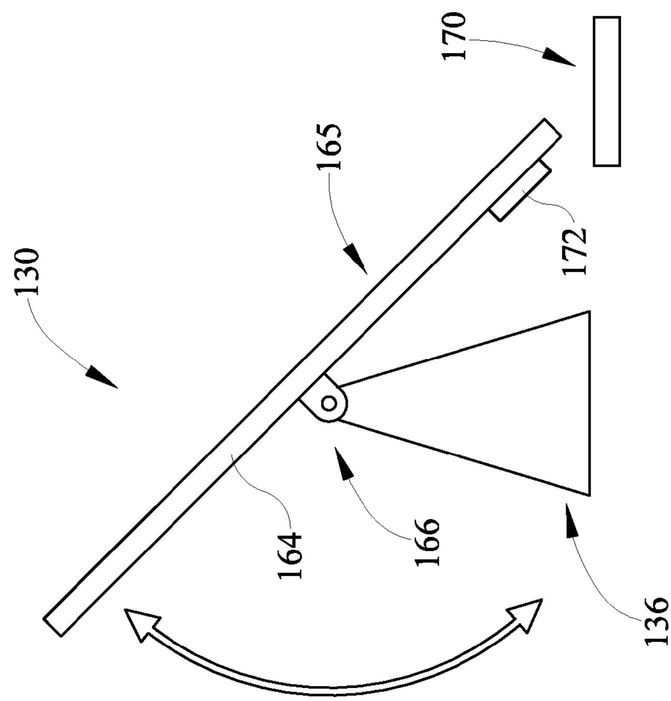
FIG. 12 depicts a side view of the alternate tie plate sorter of FIG. 11 in a first position.

Referring now to FIGS. 12 and 13, side views of the receiver 130 for sorting are depicted. The side view is rotated 90 degrees from that shown in FIG. 11. In FIG. 12, the receiver is shown having a first end which is elevated and a second end which deposits tie plates on the output conveyor 170. In FIG. 13, the second end is elevated so that the loose tie plates are moved to the opposite end of the receiver 130 and the properly oriented plates are held in position by magnets adjacent the pocket area 132 of the receiver 130. As shown in FIGS. 12 and 13, the motion is cyclical in that the ends of the receiver 130 move between first and second positions in a reciprocating fashion. This may be done through the use of a motor or an actuator, such as a pneumatic or fluid actuator.

In operation, the tie plates 16 are loaded on the cyclical receiver 130. The flat platter 164 of receiver 130 pivots has an upper side or surface 165 along which the tie plates 16 slide. The surface 165 of receiver 130 pivots at joint 166. The tie plates are moved away from the conveyor 170 by pivoting the end of receiver 130 opposite the conveyor 170 downward, as shown in FIG. 13. Next the receiver is rotated to the position in FIG. 12 causing the tie plates to slide toward the conveyor 170. The tie plates move into the pockets 132 formed by guides 134, thus orienting the tie plates 16. When the magnets are powered off, the tie plates in pockets 132 fall on the conveyor 170. Next the receiver 130 moves toward the position in FIG. 13, and the process starts again.

Figure 17:
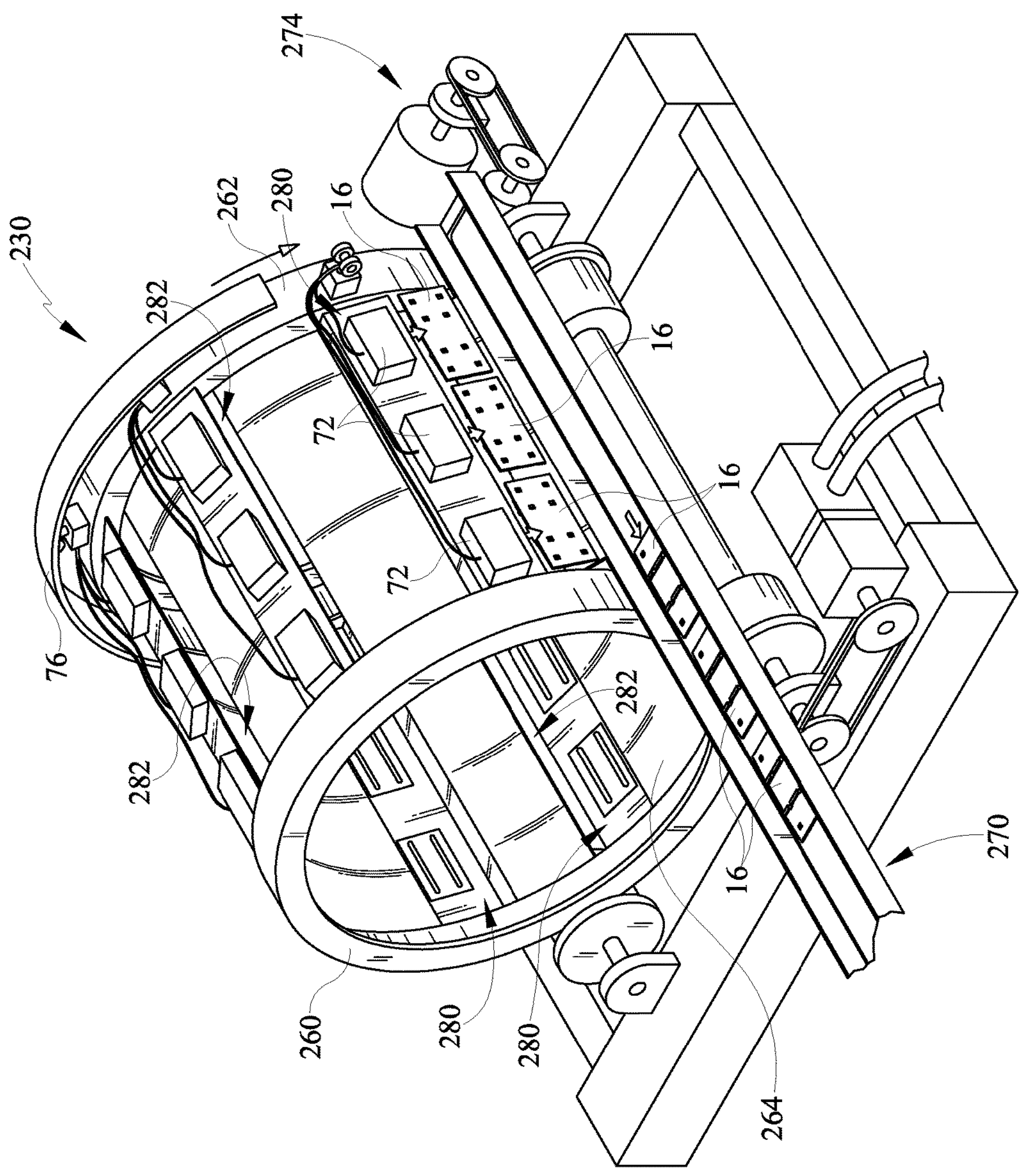
FIG. 17 depicts a perspective view of an alternative embodiment of a receiver.

Referring now to FIG. 17, a further alternative receiver 230 is shown and according to some embodiments has a first driving ring 260 and a second driving ring 262 spaced apart by at least one tie plate receiving surface 264. According to at least one exemplary embodiment, the at least one receiving surface 264 defines a circular shaped interior extending between the driving rings 260, 262. However, multiple shapes may utilize and such description should not be considered limiting. The tie plate receiving surface 264 includes a plurality of magnets 72 which retain tie plates against the tie plate receiving surfaces 264 at each magnet location. As previously described during operation, tie plates enter the receiver 230 at a first location and exit at a second location. However, at least some embodiments utilize at least one pocket 280. The pocket 280 comprises multiple magnets 72 thereon so that the tie plates 16 are retained in the pocket area of the receiver 230. The pocket 280 is defined by multiple walls however an opening or aperture 282 is defined along one area of the pocket 280 so that tie plates may be discharged.

Adjacent to receiver 230 is an external conveyor 270. The conveyor 270 receives tie plates 16 as they are discharged from the receiver 230. The conveyor 270 may take various forms including a roller conveyor, belt conveyor or other feeding or sliding mechanisms to move the tie plates 16. Adjacent the conveyor 270 is an exemplary motor and belt drive which defines a drive assembly 274. However the drive assembly may take various forms including gear drive or direct drive systems connected to a head or tail pulley.

In operation, the tie plates 16 are received through the opening defined by the first driving ring 260. The tie plates 16 rotate and slide within the receiver 230 and are retained and positioned by the retaining structure 72, such as for example a magnet. More specifically, the tie plates move into the pockets 280 and are held in position by the magnets 72 until the magnets are deactivated by ending communication with the power supply 76. When the power supply no longer powers the magnet 72, the aperture 282 is oriented generally downwardly so that the tie plate 16 are released through the receiver 230 toward the conveyor 270. From this position, the tie plate 16 moves away from the receiver 230 along the external conveyor 270.

Figure 18:
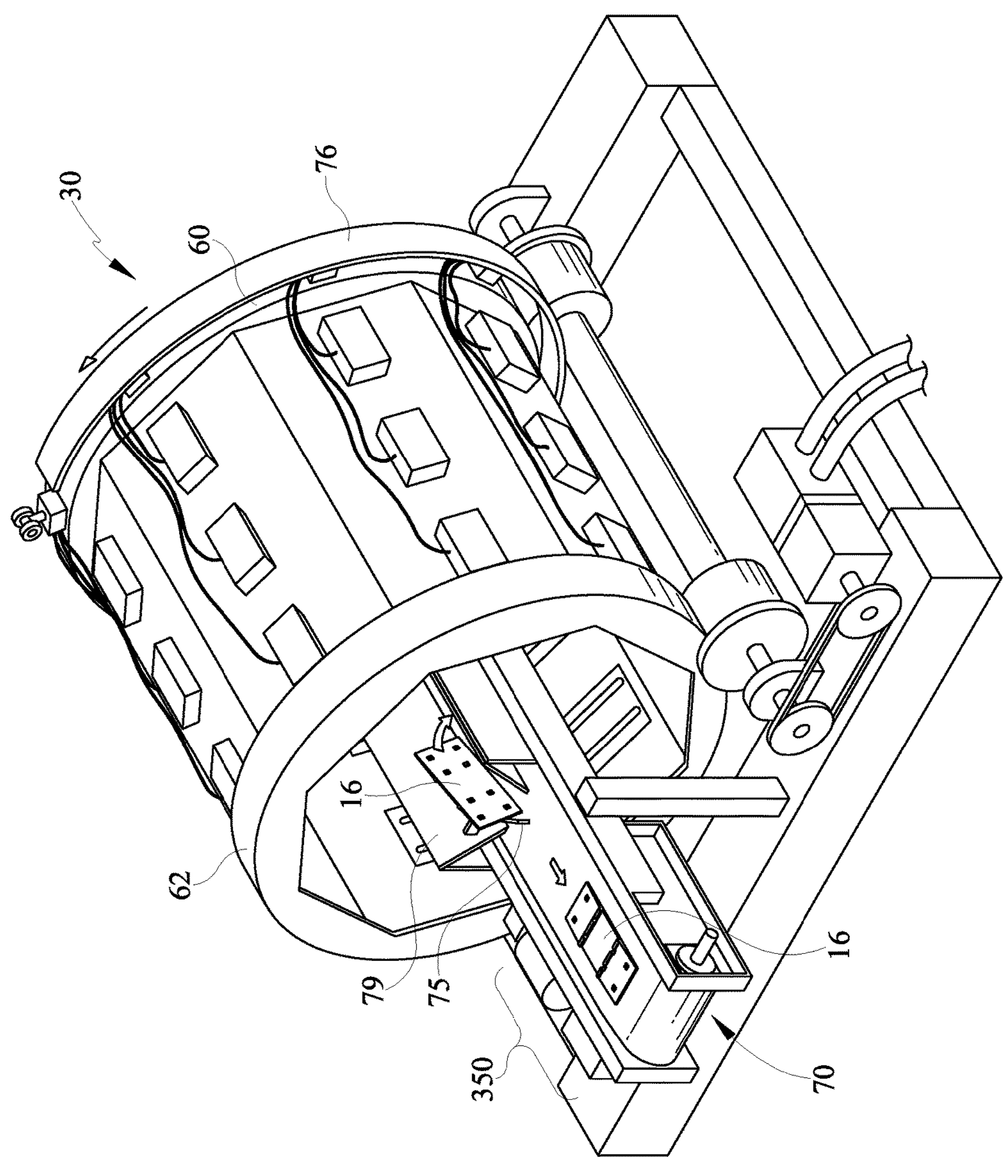
FIG. 18 depicts a perspective view of a further alternative output conveyor extending from a receiver.

Referring now to FIG. 18, a perspective view of the tie plate sorter assembly is shown. In exemplary discharge or output conveyor 70 is depicted internally of the receiver 30. According to one exemplary embodiment, the conveyor output 70 is generally positioned toward one side of the receiver 30. The conveyor 70 includes a motor and gear box defining a drive assembly 350. The conveyor 70 may be centered or may be moved toward one side of the receiver 30.

During rotation of the receiver 30, tie plates 16 are released as previously described from being retained from the retaining structures or mechanisms, for example, magnets. The magnets 72 may release tie plates 16 along sides or at the top of the rotation. When released at the side of the receiver 30, the tie plates 16 engage a slide surface 79 which directs the plates 16 onto the conveyor 70. Since the slide surface 79 temporarily positions tie plates on a lower edge of the tie plate 16 and leaning at an angle, the tie plate engages a flipping bar 75. The bar 75 causes the tie plate 16 to move to the desired orientation which is bottom down for further movement along the conveyor 70 and discharge to other tie plate distribution structures.

Figure 19:
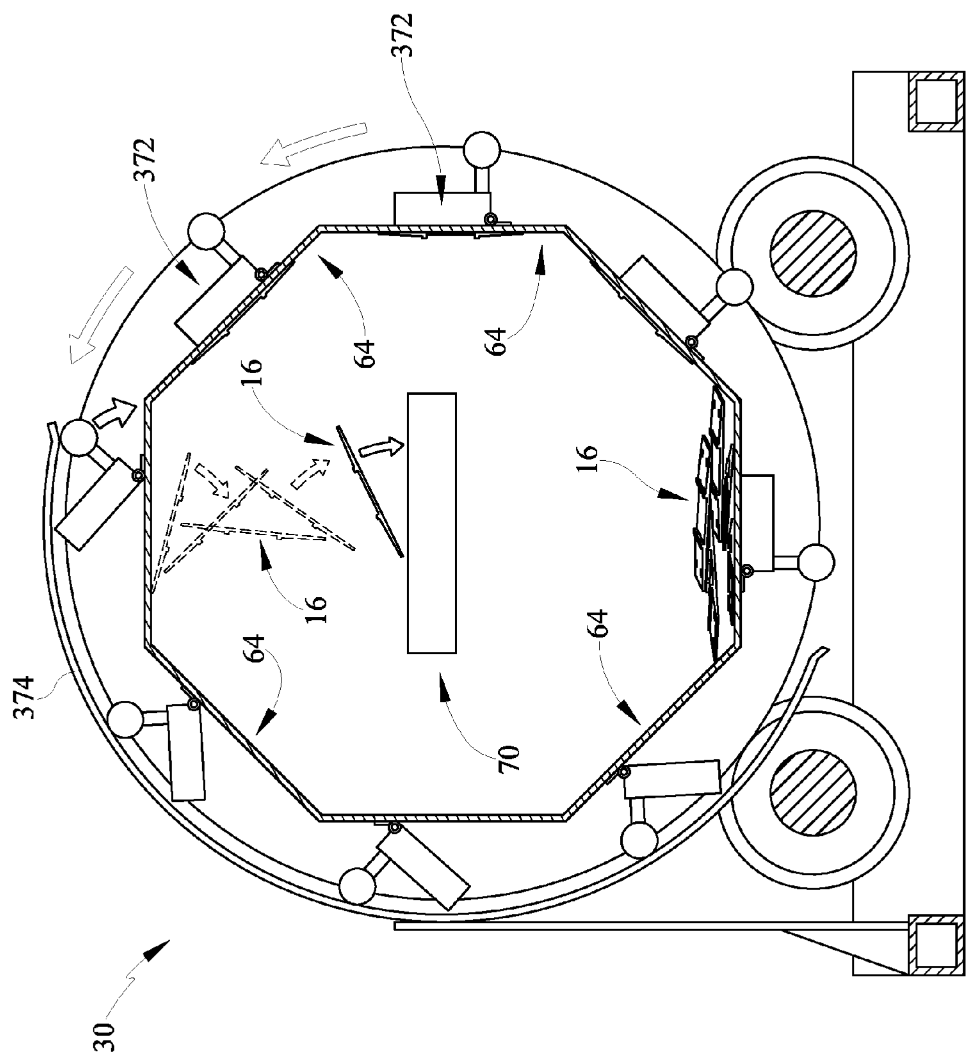
FIG. 19 is an end section view of an alternate retaining mechanism disposed on a receiver.

Referring now to FIG. 19, the receiver 30 shown in end view. In this view the receiver 30 rotates in a counterclockwise direction. The exemplary embodiments depicted in FIG. 19 show that the retaining structures 372 are permanent magnets and are engaged or mechanically disengaged from the receiver 30 depending on the position of the receiver during rotation. For example, magnets 372 are normally positioned against the surfaces 64 of the receiver 30. As the magnet 372 moves towards a disengagement bar 374, the magnets 372 include mechanical structure which engages the bar 374 causing the magnet to pivot or lift away from the surface 64 of the receiver 30. When the magnet moves away from the surface 64, the tie plate 16 may be released to the output conveyor 70. Once the receiver 30 continues rotation and magnets 370 clear the disengagement bar 374 near the bottom of the rotation cycle, the magnets 372 reengage the surfaces 64 and begin lifting tie plate 16 upwardly along the rotation cycle until reaching the disengagement bar 374. Although a pivot structure is shown, the magnet 372 may be moved in a variety of ways.

It should be understood that the various retaining structures such as electromagnetic, magnetic or other structures which are used to retain the tie plates 16 against the inside surfaces of the receiver 30 may be utilized in combination with various embodiments of an internal conveyor 70 or external conveyor 170. Additionally, the various forms of magnets may be utilized with any of the embodiments described herein.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A method of separating tie plates, comprising;

rotating a tie plate receiver;

receiving tie plates in said tie plate receiver;

magnetically retaining said tie plates at a first location; and, magnetically releasing said tie plates at a second location on to a discharge conveyor.

2. The method of claim 1, wherein said discharge conveyor is exterior of said tie plate receiver.

3. The method of claim 1, said magnetically retaining comprising engaging said tie plate with a permanent magnet.

4. The method of claim 3, said magnetically releasing comprising moving a permanent magnetic.

5. The method of claim 1, said magnetically retaining comprising powering on an electromagnet.

6. The method of claim 5, said magnetically releasing comprising powering off said electromagnet.

7. The method of claim 1 wherein said first location is a first rotational position.

8. The method of claim 1 wherein said second location is a second rotational position.

9. The method of claim 1 said releasing causing said tie plates to move on to a conveyor.

10. A method of separating tie plates, comprising:

rotating a tie plate receiver;

depositing tie plates within said tie plate receiver;

magnetically retaining each of said tie plates at a first location;

moving each of said tie plates to a second location;

magnetically releasing said tie plates at said second location.

11. The method of claim 10, said releasing positioning said tie plate on to a conveyor.

12. The method of claim 10, said magnetically retaining positioning said tie plate against a surface of said tie plate receiver.

13. The method of claim 10, said magnetically retaining and said magnetically releasing being with a permanent magnet.

14. The method of claim 13 further comprising moving said permanent magnet relative to said tie plate receiver.

15. The method of claim 10, said magnetically retaining and said magnetically releasing being with an electromagnet.

16. The method of claim 15, further comprising powering on and off said electromagnet.

17. A method of separating tie plates, comprising:

rotating a tie plate receiver;

feeding tie plates in said tie plate receiver;

magnetically retaining said tie plates at a first position;

moving said tie plates to a second position during said rotating;

releasing said tie plates at said second position.

18. The method of claim 17, said releasing being on to a conveyor.

19. The method of claim 17 wherein said magnetically retaining is by one of a permanent magnet and an electromagnet.

* * * * *